US010217420B2

(12) United States Patent
Jang et al.

(10) Patent No.: US 10,217,420 B2
(45) Date of Patent: Feb. 26, 2019

(54) DISPLAY APPARATUS AND METHOD OF CONTROLLING LUMINANCE THEREOF

(71) Applicant: Samsung Display Co., Ltd., Yongin-si, Gyeonggi-do (KR)

(72) Inventors: Hyeonyong Jang, Hwaseong-si (KR); Taehyung Kim, Anyang-si (KR); Hyungwoo Yim, Goyang-si (KR)

(73) Assignee: Samsung Display Co., Ltd., Yongin-si (KR)

(*) Notice: Subject to any disclaimer, the term of this patent is extended or adjusted under 35 U.S.C. 154(b) by 135 days.

(21) Appl. No.: 14/983,485

(22) Filed: Dec. 29, 2015

(65) Prior Publication Data

US 2016/0225327 A1 Aug. 4, 2016

(30) Foreign Application Priority Data

Jan. 29, 2015 (KR) ........................ 10-2015-0014567

(51) Int. Cl.
*G06F 1/00* (2006.01)
*G09G 3/34* (2006.01)
*G09G 3/36* (2006.01)

(52) U.S. Cl.
CPC ......... *G09G 3/3413* (2013.01); *G09G 3/3406* (2013.01); *G09G 3/3648* (2013.01); *G09G 2320/0214* (2013.01); *G09G 2320/0247* (2013.01); *G09G 2320/0646* (2013.01); *G09G 2330/022* (2013.01); *G09G 2340/0435* (2013.01)

(58) Field of Classification Search
CPC ........................... G09G 3/3614; G09G 3/3406
See application file for complete search history.

(56) References Cited

U.S. PATENT DOCUMENTS

2010/0134020 A1* 6/2010 Peng .................. H05B 33/0872 315/133
2013/0214125 A1* 8/2013 Solhusvik ......... H01L 27/14612 250/208.1
2014/0111560 A1 4/2014 Yamakawa
(Continued)

FOREIGN PATENT DOCUMENTS

KR 10-2008-0002427 A 1/2008
KR 10-2008-0017280 A 2/2008
(Continued)

OTHER PUBLICATIONS

Korean Patent Abstracts Publication No. 10-2008-0085530 A for Korea Patent No. 10-1329075 Listed Above.

*Primary Examiner* — Michael Faragalla
(74) *Attorney, Agent, or Firm* — Lewis Roca Rothgerber Christie LLP

(57) ABSTRACT

There is provided a display apparatus including a display panel including a plurality of pixels connected to a plurality of data lines and a plurality of gate lines, a driving circuit configured to control the display panel to display an image on the display panel, and to output a wake signal having a pulse period according to an operating mode, a backlight unit configured to supply light to the display panel, and a light source driving unit configured to supply a light source power voltage to the backlight unit, wherein the light source driving unit is configured to generate the light source power voltage based on the pulse period of the wake signal.

15 Claims, 6 Drawing Sheets

(56) References Cited

U.S. PATENT DOCUMENTS

| | | | | |
|---|---|---|---|---|
| 2015/0109352 | A1* | 4/2015 | Takasaki .............. | G09G 3/3406 345/690 |
| 2015/0116195 | A1* | 4/2015 | Yokonuma ........... | G09G 3/3406 345/102 |
| 2015/0138249 | A1* | 5/2015 | Miyata ................. | G09G 3/3614 345/690 |
| 2016/0005368 | A1 | 1/2016 | Park et al. | |

FOREIGN PATENT DOCUMENTS

| | | | |
|---|---|---|---|
| KR | 10-2008-0094261 | A | 10/2008 |
| KR | 10-2009-0102083 | A | 9/2009 |
| KR | 10-2011-0080044 | A | 7/2011 |
| KR | 10-2012-0045509 | A | 5/2012 |
| KR | 10-1329075 | B1 | 11/2013 |
| KR | 10-2016-0005294 | | 1/2016 |
| KR | 10-2016-0044166 | | 4/2016 |

* cited by examiner

DISPLAY APPARATUS AND METHOD OF CONTROLLING LUMINANCE THEREOF

CROSS-REFERENCE TO RELATED APPLICATION

This patent application claims priority to and the benefit of Korean Patent Application No. 10-2015-0014567, filed on Jan. 29, 2015, the entire content of which is hereby incorporated by reference.

BACKGROUND

One or more aspects of embodiments of the inventive concept described herein relate to a display apparatus and a method of controlling luminance thereof.

A display system includes a host for outputting an image data of each frame and a plurality of control signals and a display apparatus for displaying an image. The display apparatus includes a display panel for displaying the image and gate and data driving units driving the display panel. The display panel includes a plurality of gate lines, a plurality of data lines, and a plurality of pixels connected to the gate and data lines. The gate lines receive gate signals from the gate driving unit. The data lines receive data voltages from the data driving units. The pixels receive data voltages through the data lines in response to the gate signals received through the gate lines. The pixels display a gray scale corresponding to the data voltages. Thus, the image may be displayed.

SUMMARY

One or more aspects of the present disclosure provide a display apparatus that is capable of removing or substantially removing flicker in a low frequency mode and a method of controlling luminance thereof.

According to some embodiments of the present inventive concept, there is provided a display apparatus including: a display panel including a plurality of pixels connected to a plurality of data lines and a plurality of gate lines; a driving circuit configured to control the display panel to display an image on the display panel, and to output a wake signal having a pulse period according to an operating mode; a backlight unit configured to supply light to the display panel; and a light source driving unit configured to supply a light source power voltage to the backlight unit, wherein the light source driving unit is configured to generate the light source power voltage based on the pulse period of the wake signal.

In an embodiment, the driving circuit is configured to operate in a normal mode and a low frequency mode, wherein when the operating mode of the driving circuit is the normal mode, the wake signal has a first pulse period, wherein when the operating mode of the driving circuit is the low frequency mode, the wake signal has a second pulse period, and wherein the second pulse period is longer than the first pulse period.

In an embodiment, when the operating mode of the driving circuit is the low frequency mode, the light source driving unit is configured to generate the light source power voltage such that luminance of the light supplied from the backlight unit increases in synchronization with the second pulse period of the wake signal.

In an embodiment, the driving circuit includes: a timing controller configured to operate in the normal mode and the low frequency mode in response to an image signal and a control signal received from the outside; and a low frequency mode determiner configured to output the wake signal having a pulse period according to an operating mode of the timing controller.

In an embodiment, the timing controller is configured to convert the image signal into an image data signal and to generate first, second, and third control signals corresponding to the normal mode and the low frequency mode in response to the control signal.

In an embodiment, the driving circuit further includes: a source driver configured to drive the plurality of data lines in response to the first control signal and the image data signal; and a gate driver configured to drive the plurality of gate lines in response to the second control signal.

In an embodiment, the driving circuit further includes a power controller configured to supply a source power to the source driver in response to the wake signal.

In an embodiment, the light source driving unit is configured to generate the light source power voltage in response to the wake signal and the third control signal.

In an embodiment, the light source driving unit includes: a power converter configured to convert an external power voltage into the light source power voltage in response to a power control signal; a luminance compensation unit configured to output a luminance compensation signal corresponding to the pulse period of the wake signal; and a power controller configured to output the power control signal corresponding to the luminance compensation signal.

In an embodiment, the luminance compensation unit includes: a timer configured to count the pulse period of the wake signal to output a count signal; a lookup table configured to output luminance compensation data corresponding to the count signal; and a digital-analog converter configured to convert the luminance compensation data into a luminance compensation signal that is an analog signal.

According to some embodiments of the present inventive concept, there is provided a method of controlling luminance of a display apparatus including a display panel and a backlight unit supplying light to the display panel, the method including: receiving an image signal; determining an operating mode according to the received image signal; outputting a wake signal having a pulse period according to the determined operating mode; generating a light source power voltage corresponding to the pulse period of the wake signal; and supplying the light source power voltage to the backlight unit.

In an embodiment, the determining of the operating mode includes determining the operating mode as one of a normal mode and a low frequency mode according to the received image signal.

In an embodiment, the outputting of the wake signal includes: outputting the wake signal having a first pulse period when the determined operating mode is the normal mode; and outputting the wake signal having a second pulse period when the determined operating mode is the low frequency mode, wherein the second pulse period is longer than the first pulse period.

In an embodiment, in the generating of the light source power voltage, the light source power voltage is generated such that luminance of the light supplied from the backlight unit increases in synchronization with the second pulse period of the wake signal.

In an embodiment, the generating of the light source power voltage includes: outputting a luminance compensation signal corresponding to the pulse period of the wake signal; outputting a power control signal corresponding to the luminance compensation signal; and converting an external power voltage into the light source power voltage in response to the power control signal.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Hereinafter, embodiments will be described in more detail with reference to accompanying drawings.

Figure 1:
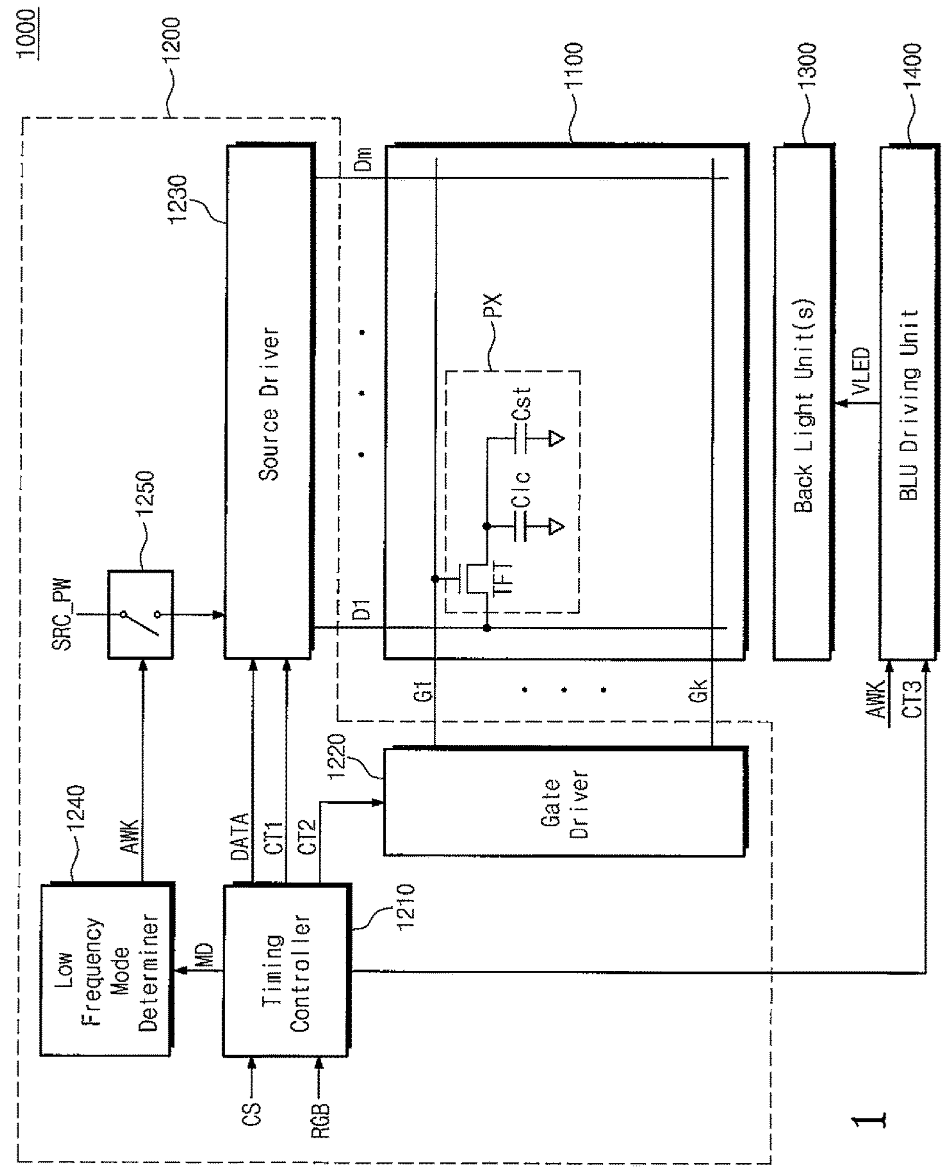
FIG. 1 is a view illustrating an exemplary configuration of a display apparatus according to some embodiments of the inventive concept.
Figure 2:
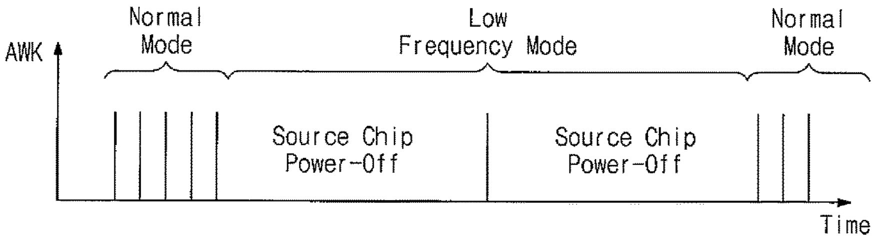
FIG. 2 is a view illustrating a generation frequency of a wake signal according to an operating mode of a timing controller of FIG. 1.

FIG. 1 is a view illustrating an exemplary configuration of a display apparatus according to some embodiments of the inventive concept. FIG. 2 is a view exemplary illustrating a generation frequency of a wake signal according to an operating mode of a timing controller of FIG. 1.

Referring to FIG. 1, a display apparatus 1000 includes a display panel 1100, a driving circuit 1200, a backlight unit 1300, and a light source driving unit 1400. The driving circuit 1200 includes a timing controller 1210, a gate driver 1220, a source driver 1230, a low frequency mode determiner 1240, and a power controller 1250.

The display panel 1100 displays an image. The display panel 1100 may not be an active display panel that emits light by itself, and may be a passive display panel requiring a separate light source. For example, the display panel 1100 may be one of a liquid crystal display panel, an electrophoretic display panel and an electrowetting display panel. Hereinafter, in the current embodiment of the inventive concept, a liquid crystal display panel having a liquid crystal display layer between two substrates is described as an example. Although not shown, the display apparatus including the liquid crystal panel may include a pair of polarizing plates disposed with the liquid crystal panel therebetween.

The display panel 1100 includes a plurality of gate lines G1 to Gk, a plurality of data lines D1 to Dm that cross the plurality of gate lines G1 to Gk, and a plurality of pixels PX arranged at an area in which the plurality of gate lines cross (e.g., intersect) the plurality of data lines D1 to Dm in a matrix form. The plurality of gate lines G1 to Gk are insulated from the plurality of data lines D1 to Dm.

Each of the pixels PX includes a switching transistor TFT connected to a corresponding data line and gate line, a crystal capacitor Clc connected to the switching transistor TFT, and a storage capacitor Cst.

The timing controller 1210 receives an image signal RGB and control signals CS for controlling the image signal RGB, for example, a vertical synchronization signal, a horizontal synchronization signal, a main clock signal, and a data enable signal, from the outside. The timing controller 1210 provides a data signal DATA in which the image signal RGB is processed to match an operating condition of the display panel 1110 in accordance with (on the basis of) the control signals CS and also provides a first control signal CT1 to the source driver 1230. Also, the timing controller 1210 provides a second control signal CT2 to the gate driver 1220 and a third control signal CT3 to the light source driving unit 1400. The first control signal CT1 may include a clock signal, a polarity inversion signal, and a line latch signal. The second control signal CT2 may include a vertical synchronization start signal, an output enable signal, and a gate pulse signal.

The timing controller 1210 operates in a low frequency mode when the image signal RGB provided from the outside is not changed for a long time (e.g., for several tens of seconds), that is, when the same still image is received for a long time. During the low frequency mode, the timing controller 1210 lowers a frequency of the clock signal included in the first control signal CT1 and sets to extend a reversal period of the polarity inversion signal (e.g., about 1 Hz or less). Also, during the low frequency mode, the timing controller 1210 lowers the vertical synchronization start signal, the output enable signal, and the gate pulse signal included in the second control signal CT2. The timing controller 1210 may output a mode signal MD that indicates the operating mode.

As illustrated in FIG. 2, the low frequency mode determiner 1240 may generate a wake signal AWK according to the operating mode of the timing controller 1210. For example, when the mode signal MD outputted from the timing controller 1210 has a low level, which represents a normal mode, the low frequency mode determiner 1240 outputs the wake signal AWK as a pulse signal having a normal frequency (e.g., about 60 Hz). On the other hand, when the mode signal MD outputted from the timing controller 1210 has a high level, which represents a low frequency mode, the low frequency mode determiner 1240 outputs the wake signal AWK as a pulse signal having a frequency (e.g., about 1 Hz or less) lower than the normal frequency. When the timing controller 1210 operates in the low frequency mode, the wake signal AWK has a pulse period that is longer than that of the normal mode.

The power controller 1250 may transmit a source power SRC_PW to the source driver 1230 in response to the wake signal AWK. For example, while the timing controller 1210 operates in the normal mode, the power controller 1250 provides the source power SRC_PW to the source driver 1230 so that the source driver 1230 normally operates. On the other hand, when the timing controller 1210 operates in the low frequency mode, a supply period of the source power SRC_PW provided to the source driver 1230 may be extended. Therefore, the power consumed in the source driver 1230 during the low frequency mode may be reduced.

When the timing controller 1210 operates in the normal mode, an electric charge charged in the liquid crystal capacitor Clc inside the pixel PX of the display panel 1100 may be refreshed at a fast speed (e.g., about 60 Hz). However, when the timing controller 1210 operates at the low frequency mode, the electric charge charged in the liquid crystal capacitor Clc inside the pixel PX of the display panel 1100 may be gradually reduced by leakage current. When the electric charge charged in the liquid crystal capacitor Clc is reduced to a predetermined level or less, and then the electric charge is recharged in the liquid crystal capacitor Clc by the wake signal AWK, luminance may change. This luminance change may be recognized as a flicker to a user.

The gate driver 1220 is electrically connected to the gate lines G1 to Gk disposed in the display panel 1100 to provide a gate signal to the gate lines G1 to Gk. For example, the gate driver 1220 may generate the gate signal for driving the gate lines G1 to Gk in accordance with (on the basis of) the second control signal CT2 to successively output the generated gate signal to the gate lines G1 to Gk.

The source driver 1230 may output a data voltage in which the image data RGB is converted in accordance with (on the basis of) the first control signal CT1 to the data lines D1 to Dm.

The backlight unit 1300 is disposed under the display panel 1100 to provide light to the display panel 1100. In the embodiment, the backlight unit 1300 may include a plurality of light emitting diodes (LEDs).

The light source driving unit 1400 may control the backlight unit 1300 in response to the third control signal CT3. In particular, the light source driving unit 1400 may control a light source power voltage VLED provided to the backlight unit 1330 in response to the wake signal AWK and the third control signal CT3. The light source driving unit 1400 may generates the light source power voltage VLED for controlling the luminance of the light generated from the backlight unit 1300 in response to the wake signal AWK. For example, the luminance of the light generated from the backlight unit 1300 may be controlled according to a generation period of the wake signal AWK.

Figure 3:
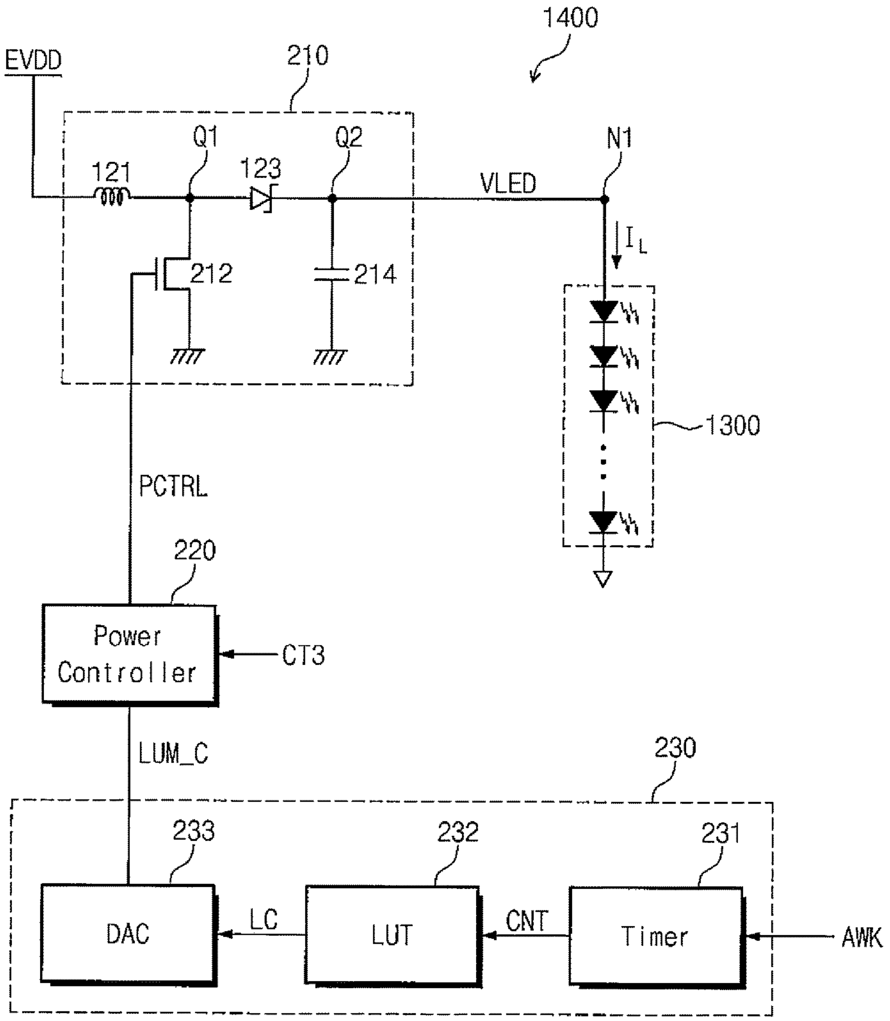
FIG. 3 is a block diagram illustrating an exemplary configuration of a light source driving unit of FIG. 1.

FIG. 3 is a block diagram illustrating an exemplary configuration of a light source driving unit of FIG. 1.

Referring to FIG. 3, the light source driving unit 1400 includes a power converter 210, a power controller 220, and a luminance compensation unit 230.

The power converter 210 may convert a power voltage EVDD inputted from the outside into the light source power voltage VLED. A voltage level of the light source power voltage VLED is set to a voltage level that is sufficient to drive the light emitting diodes inside the backlight unit 1300.

The power converter 210 includes an inductor 211, an NMOS transistor 212, a diode 213, and a capacitor 214. The inductor 211 is connected between the power voltage EVDD supplied from the outside and a node Q1. The NMOS transistor 212 is connected between the node Q1 and a ground voltage. A gate of the NMOS transistor 212 is connected to a power control signal PCTRL from the power controller 220. The diode 213 is connected between the node Q1 and a node Q2. In the current embodiment, the diode 213 may be a Schottky diode. The capacitor 214 is connected between the node Q2 and the ground voltage. The light source power voltage VLED of the node Q2 is supplied to one end of the backlight unit 1300 through a first node NI.

The power converter 210 may include one of various suitable types (kinds) of DC/DC converters, such as a buck-boost type, boost type, and high-bridge type converters.

The power converter 210 having configurations as illustrated in FIG. 3 may convert the power voltage EVDD supplied from the outside into the light source power voltage VLED to output the light source power voltage VLED. In particular, generation of the light source power voltage VLED may be controlled by turning on/off the NMOS transistor 212 according to the power control signal PCTRL that is applied to the gate of the NMOS transistor 212.

The backlight unit 1300 includes an LED string. In the current embodiment, although the backlight unit 1300 includes one LED string, the number of the LED string included in the backlight unit 1300 may variously change.

The LED string included in the backlight unit 1300 includes the plurality of LEDs connected to each other in series. Each of the plurality of LEDs may include a white LED that emits a white color, a red LED that emits a red color, a blue LED that emits a blue color, and a green LED that emits a green color. The LEDs may be LEDs generally driven by a low forward driving voltage Vf so as to reduce power consumption. Also, the narrower deviation of the forward driving voltage VI of the LEDs is better for the uniformity of the luminance. Further, it is desirable that the forward driving voltage Vf of the LEDs have low deviation to ensure uniformity of the luminance. In the current embodiment, the backlight unit 1300 includes the LED string, however, the backlight unit 1300 may be constituted by a laser diode and a carbon nano tube instead of the LEDs. The one end of the backlight unit 1300 is connected to the light source power voltage VLED from the power converter 210. The other end of the backlight unit 1300 may be connected to the ground voltage.

The luminance compensation unit 230 may receive the wake signal AWK and output a luminance compensation signal LUM_C corresponding to the wake signal AWK. The luminance compensation unit 230 includes a timer 231, a lookup table 232, and a digital-analog converter 233.

The timer 231 may start a count in synchronization with a pulse of the wake signal AWK and be reset in synchronization with the next pulse of the wake signal AWK. That is, the timer 231 may count a time until the next pulse is generated after a first pulse of the wake signal AWK is generated to output a count signal CNT.

The lookup table 232 may store a plurality of luminance compensation data. The lookup table 232 may output a luminance compensation data LC corresponding to the count signal CNT from the timer 231. The digital-analog converter 233 may convert the luminance compensation data LC into the luminance compensation signal LUM_C that is an analog signal.

The power controller 220 may generate the power control signal PCTRL for controlling turning on/off of the NMOS transistor 212 in response to the third control signal CT3 from the timing controller 1210 illustrated FIG. 1. Also, the power controller 220 may generate the power control signal PCTRL in response to the luminance compensation signal LUM_C from the luminance compensation unit 230.

Figure 4:
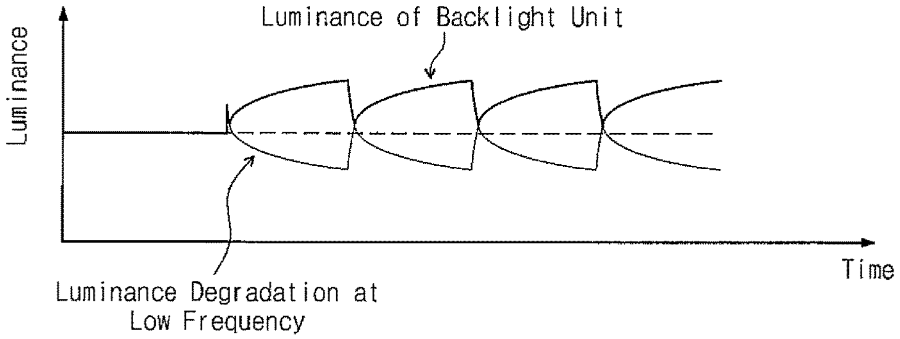
FIG. 4 is a view conceptually illustrating a manner in which a flicker is reduced by the light source driving unit of FIG. 3.

FIG. 4 is a view conceptually illustrating a manner in which a flicker is reduced by the light source driving unit of FIG. 3.

Referring to FIGS. 3 and 4, when the timing controller 1210 operates in the normal mode, the electric charge that is charged in the liquid crystal capacitor Clc inside the pixel PX of the display panel 1100 may be refreshed at the fast speed (e.g., about 60 Hz). However, when the timing controller operates in the low frequency mode, the electric charge voltage that is charged in the liquid crystal capacitor Clc inside the pixel PX of the display panel 1100 may be gradually reduced by the leakage current. When the electric charge that is charged in the liquid crystal capacitor Clc is reduced and then recharged into the liquid crystal capacitor Clc by the wake signal AWK, a change in luminance may detected. A thin solid line in FIG. 4 indicates the luminance change of the image displayed on the display panel (see, e.g., reference numeral 1100 of FIG. 1). It may be known that the luminance of the image displayed on the display panel 1100 is reduced as time passes after the electric charge is charged in the liquid crystal capacitor Clc inside the pixel PX of the display panel 1100.

The light source driving unit 1400 may adjust the luminance of the light emitted from the backlight unit 1300 according to the time from when the first pulse of the wake signal AWK is generated to when the next pulse is generated to compensate the luminance.

For example, when the timing controller 1210 operates in the low frequency mode, the count signal CNT outputted from the timer 231 continuously increases from when the first pulse of the wake signal AWK is generated to when the next pulse is generated. As the count signal CNT increases, a luminance compensation value of the luminance compensation data LC outputted from the lookup table 232 gradually increases. As the luminance compensation value of the luminance compensation data LC increases, a pulse width of the luminance compensation signal LUM_C outputted from the digital-analog converter 233 gradually increases. Thus, a pulse width of the power control signal PCTRL outputted from the power controller 220 increases. As the pulse width of the power control signal PCTRL increases, a supply time of the light source power voltage VLED may gradually increase. Thus, the light emitting luminance of the light source driving unit 1400 increases (see, e.g., the thick solid line of FIG. 4). That is, the luminance compensation unit 230 may generate the light source power voltage VLED so that the light emitting luminance of the light source driving unit 1400 increases according to the pulse period of the wake signal AWK.

Because the light emitting luminance of the light source driving unit 1400 increases in inverse proportion to the luminance reduction, which is due to reduction of the electric charge that is charged in the crystal capacitor Clc, a flicker phenomenon of the image displayed on the display panel 1100 may be reduced or minimized.

The timer 231 illustrated in FIG. 3 resets the count signal CNT when the pulse of the wake signal AWK is re-inputted. Also, the timer 231 may be set so that the timer 231 performs a count operation when the pulse period of the wake signal AWK is longer than that (about 60 Hz) of the normal mode. Thus, while the timing controller 1210 operates in the normal mode, the luminance of the backlight unit 1300 may change in accordance with (on the basis of) only the third control signal CT3.

Figure 5:
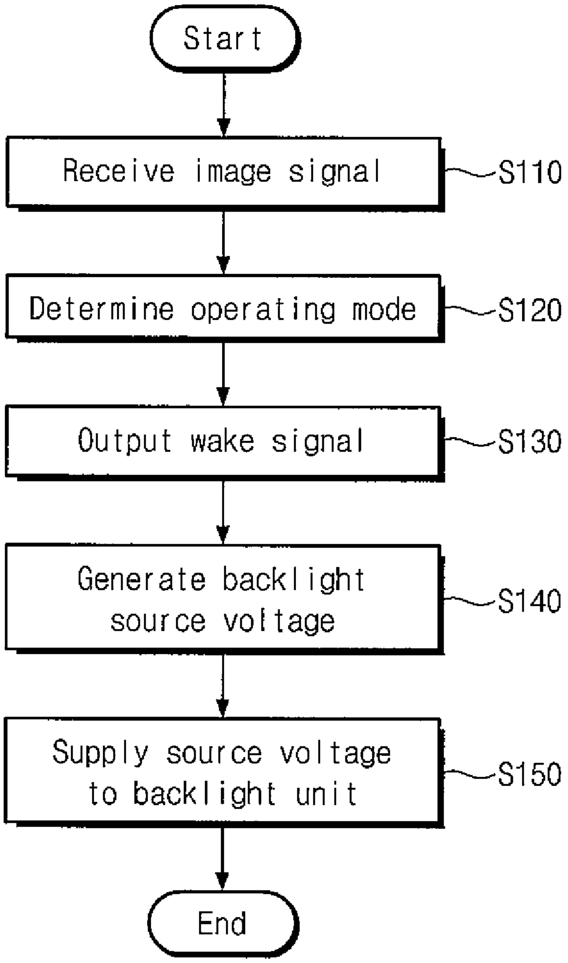
FIG. 5 is a flowchart showing an exemplary method of controlling luminance of the display apparatus according to an embodiment of the inventive concept.

FIG. 5 is a flowchart showing an exemplary method of controlling luminance of the display apparatus according to an embodiment of the inventive concept.

Referring to FIGS. 1 and 5, in block S110, the timing controller 1210 receives the image signal RGB supplied from the outside. In block S120, when the image signal RGB is not changed for a long time (e.g., several tens of seconds), that is, the same still image is received for a long time, the timing controller 1210 operates in the low frequency mode. In block S130, the low frequency mode determiner 1240 determines an operating mode of the timing controller 1210 to generate the wake signal AWK having the pulse period corresponding to the determined operating mode.

The luminance compensation unit 230 inside the light source driving unit 1400 generates the luminance compensation signal LUM_C corresponding to the pulse period of the wake signal AWK. In block S140, the light source driving unit 1400 generates the light source power voltage VLED provided to the backlight unit 1300 in response to the luminance compensation signal LUM_C. The light source driving unit 1400 generates the light source power voltage VLED in a dimming manner to provide the light source power voltage VLED to the backlight unit 1300.

According to the luminance control method, the light emitting luminance of the light source driving unit 1400 may increase in inverse proportion to the luminance reduction of the image displayed on the display panel 1100 during the low frequency mode. Thus, the flicker phenomenon of the image displayed on the display panel 1100 may be reduced or minimized.

Figure 6:
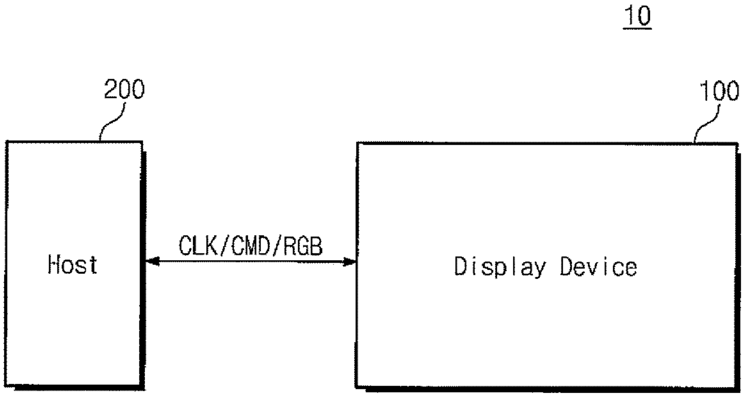
FIG. 6 is a block diagram exemplary illustrating a display system according to an embodiment of the inventive concept.

FIG. 6 is a block diagram illustrating an exemplary display system according to an embodiment of the inventive concept.

Referring to FIG. 6, a display system 10 includes a display apparatus 100 and a host 200. The host 200 provides a clock signal CLK, a command CMD, and the image signal RGB to the display apparatus 100. The host 200 may be one of a Central Processing Unit (CPU), a microprocessor, a graphic controller, and an application processor (AP).

The display apparatus 100 may have the same circuit configuration as that of the display apparatus 1000 illustrated in FIG. 1. The display apparatus 100 operates in the low frequency mode when the image signal RGB received from the host 200 is determined as the same still image for a long time. During the low frequency mode, the display apparatus 100 may increase the luminance of the light source in inverse proportion to the luminance reduction of the image displayed on the display panel to prevent or reduce deterioration of the quality of the displayed image.

As described above, the display apparatus according to some embodiments of the inventive concept may generate the wake signal having the pulse period according to the operating mode of the timing controller. Also, the display apparatus according to some embodiments of the inventive concept may supply the light source power voltage to the backlight unit according to the pulse period of the wake signal to compensate the luminance reduction of the display panel. Therefore, the flicker of the image displayed on the display panel may be prevented or reduced.

It will be understood that, although the terms “first”, “second”, “third”, etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

In addition, it will also be understood that when a layer is referred to as being “between” two layers, it can be the only layer between the two layers, or one or more intervening layers may also be present.

The terminology used herein is for the purpose of describing particular embodiments and is not intended to be limiting of the inventive concept. As used herein, the singular forms “a” and “an” are intended to include the plural forms as well, unless the context clearly indicates otherwise. It will be further understood that the terms “include,” “including,”

"comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The display device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the display device may be formed on one integrated circuit (IC) chip or on separate IC chips. Further, the various components of the display device may be implemented on a flexible printed circuit film, a tape carrier package (TCP), a printed circuit board (PCB), or formed on a same substrate. Further, the various components of the display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A display apparatus comprising:

a display panel comprising a plurality of pixels connected to a plurality of data lines and a plurality of gate lines;

a driving circuit configured to control the display panel to display an image on the display panel, and to output a wake signal having a pulse period according to an operating mode;

a backlight unit configured to supply light to the display panel based on a light source power voltage; and a light source driving unit configured to generate the light source power voltage based on a count signal and to supply the light source power voltage to the backlight unit to control an amount of light supplied by the backlight unit, wherein the light source driving unit comprises a timer configured to count a time until a next pulse is generated after a first pulse of the wake signal is generated to output the count signal, and wherein, when the count signal increases, the light source driving unit is configured to generate the light source power voltage such that luminance of the light supplied from the backlight unit increases based on the count signal.

2. The display apparatus of claim 1, wherein the driving circuit is configured to operate in a normal mode and a low frequency mode, wherein when the operating mode of the driving circuit is the normal mode, the wake signal has a first pulse period, wherein when the operating mode of the driving circuit is the low frequency mode, the wake signal has a second pulse period, and wherein the second pulse period is longer than the first pulse period.

3. The display apparatus of claim 2, wherein, when the operating mode of the driving circuit is the low frequency mode, the light source driving unit is configured to generate the light source power voltage such that luminance of the light supplied from the backlight unit increases in synchronization with the second pulse period of the wake signal.

4. The display apparatus of claim 2, wherein the driving circuit comprises:

a timing controller configured to operate in the normal mode and the low frequency mode in response to an image signal and a control signal received from the outside; and a low frequency mode determiner configured to output the wake signal having a pulse period according to an operating mode of the timing controller.

5. The display apparatus of claim 4, wherein the timing controller is configured to convert the image signal into an image data signal and to generate first, second, and third control signals corresponding to the normal mode and the low frequency mode in response to the control signal.

6. The display apparatus of claim 5, wherein the driving circuit further comprises:

a source driver configured to drive the plurality of data lines in response to the first control signal and the image data signal; and a gate driver configured to drive the plurality of gate lines in response to the second control signal.

7. The display apparatus of claim 6, wherein the driving circuit further comprises a power controller configured to supply a source power to the source driver in response to the wake signal.

8. The display apparatus of claim 5, wherein the light source driving unit is configured to generate the light source power voltage in response to the wake signal and the third control signal.

9. The display apparatus of claim 1, wherein the light source driving unit comprises:

a power converter configured to convert an external power voltage into the light source power voltage in response to a power control signal;

a luminance compensation unit configured to output a luminance compensation signal corresponding to the pulse period of the wake signal; and a power controller configured to output the power control signal corresponding to the luminance compensation signal.

10. The display apparatus of claim 9, wherein the luminance compensation unit comprises:

a lookup table configured to output luminance compensation data corresponding to the count signal; and a digital-analog converter configured to convert the luminance compensation data into a luminance compensation signal that is an analog signal.

11. A method of controlling luminance of a display apparatus comprising a display panel and a backlight unit supplying light to the display panel, the method comprising:

receiving an image signal;

determining an operating mode according to the received image signal;

outputting a wake signal having a pulse period according to the determined operating mode;

counting a time until a next pulse is generated after a first pulse of the wake signal is generated and outputting a count signal;

generating a light source power voltage corresponding to the count signal; and supplying the light source power voltage to the backlight unit to control an amount of light supplied by the backlight unit based on the light source power voltage, wherein the generating of the light source power voltage is such that, when the count signal increases, luminance of the light supplied from the backlight unit increases based on the count signal.

12. The method of claim 11, wherein the determining of the operating mode comprises determining the operating mode as one of a normal mode and a low frequency mode according to the received image signal.

13. The method of claim 12, wherein the outputting of the wake signal comprises:

outputting the wake signal having a first pulse period when the determined operating mode is the normal mode; and outputting the wake signal having a second pulse period when the determined operating mode is the low frequency mode, wherein the second pulse period is longer than the first pulse period.

14. The method of claim 13, wherein, in the generating of the light source power voltage, the light source power voltage is generated such that luminance of the light supplied from the backlight unit increases in synchronization with the second pulse period of the wake signal.

15. The method of claim 13, wherein the generating of the light source power voltage comprises:

outputting a luminance compensation signal corresponding to the count signal;

outputting a power control signal corresponding to the luminance compensation signal; and converting an external power voltage into the light source power voltage in response to the power control signal.

* * * * *